United States Patent [19]

Bergamini

[11] 4,028,945

[45] June 14, 1977

[54] PROTECTION SYSTEM FOR THE OVERPRESSURES OF A SILICIUM WAFER SENSOR USED IN A DIFFERENTIAL PRESSURE TRANSMITTER

[75] Inventor: Giorgio Bergamini, Corso Sicilia, Italy

[73] Assignee: Nuovo Pignone, S.p.A., Italy

[22] Filed: Nov. 20, 1975

[21] Appl. No.: 633,858

[30] Foreign Application Priority Data

Nov. 21, 1974 Italy .................................. 29682/74

[52] U.S. Cl. ............................ 73/395; 73/398 AR; 73/407 R
[51] Int. Cl.² ...................... G01L 7/08; G01L 9/06
[58] Field of Search .... 73/407 R, 407 PR, 398 AR, 73/398 C, 410, 398 R, 395

[56] References Cited

UNITED STATES PATENTS

| 2,977,991 | 4/1961 | Bauer ................................. 73/407 |
| 3,245,264 | 4/1966 | Kaplan et al. ....................... 73/407 |
| 3,313,158 | 4/1967 | Giovanni ....................... 73/398 AR |

*Primary Examiner*—Donald O. Woodiel
*Attorney, Agent, or Firm*—Ralph M. Watson

[57] ABSTRACT

This invention relates to a system which protects against excessive pressure or overpressure being applied to a silicium wafer sensor fixedly mounted in a differential pressure transmitter between two wave separation membranes. The differential pressure arising between the two zones located astride and rigidly mounted silicium wafer sensor is controlled, so as to not exceed prefixed dangerous values, by a protection system having an expansion bellows located between the said two zones and polarized by a single pre-charged spring which is compressed when the bellows move. In one embodiment, the bellows is movable towards the low pressure so that the separation membrane is moved onto its respective seat which is part of the body of the transmitter only when the said differential pressure exceeds the precharge value of the said spring.

Thus, within the measuring range of the transmitter, the protection system does not affect the measuring since it does not move, and therefore the measurement is practically effected without an appreciable displacement of the liquid and consequently an appreciable deformation of the separation membrane. On the other hand, for differential pressures exceeding the said measuring range and hence the pre-charge value of said polarization spring, the moving of the separation membrane of the high pressure side to its seat which is caused by the displacement of the expansion bellows towards the zone of the lower pressure, halts further increases of the high pressure and prevents transmission to the silicium wafer sensor. The differential pressure is thereby limited to the calibration value of the pre-charge of the said polarization spring.

8 Claims, 4 Drawing Figures

PROTECTION SYSTEM FOR THE OVERPRESSURES OF A SILICIUM WAFER SENSOR USED IN A DIFFERENTIAL PRESSURE TRANSMITTER

The present invention relates to a simple and economical system for protecting against applying excessive pressure to a silicium wafer sensor rigidly mounted in a differential pressure transmitter.

In the field of differential pressure transmitters many systems already known for protecting against the application of excessive pressure known, but said known systems are all based on a displacement or deformation of the measuring element or other resilient element acting as a lung when the differential pressure varies they operate by stopping, by means of a stroke end or other means, the displacement of the measuring element or by intercepting the ducts connecting the high pressure chamber to the low pressure chamber when the differential pressure to be tested tends to exceeds the limits of the operating range.

It will be readily understood that the use of such a protective system cannot be made when a silicium wafer sensor is utilized as an element measuring the differential pressure, since it does not produce a perceptible displacement or deformation during measurement.

In the latter case the problem of protection against the excessive pressure has been solved by mounting the silicium wafer sensor not rigidly, but on a movable support so as to still make use of the conventional protective systems.

This solution, however, in addition to involving noticiable construction complications, does not take advantage of the specific proprieties of the silicium wafer, i.e. to obtain a transmitter having the maximum of linearity and constancy in the whole calibration field to the various static pressures since the measuring of the differential pressure occurs with an appreciable displacement of liquid and therefore with a variation in the geomatrical configuration of the separation membrane.

An object of the present invention is to obviate the above-said drawbacks and to provide a system which protects against excessive pressure being applied to a silicium wafer sensor fixedly mounted in a differential pressure transmitter.

According to the invention to the differential pressure arising between the two zones located astride said rigidly mounted silicium wafer sensor is controlled, so as to not exceed prefixed dangerous values, by a protection system having an expansion bellows located between the said two zones and polarized by a single pre-charged spring, the bellows is movable towards the low pressure so that the separation membrane is moved onto its respective seat which is part of the body of the transmitter only when the said differential pressure exceeds the pre-charge value of the said spring.

Thus, within the measuring range of the transmitter, the protection system does not affect the measuring since it does not move, and therefore the measurement is practically effected without an appreciable displacement of the liquid and consequently an appreciable deformation of the separation membrane. On the other hand differential pressures exceeding the said measuring range and hence the pre-charge value of said polarization spring, the moving of the separation membrane of the high pressure side to its seat which is caused by the displacement of the expansion bellows towards the zone of the lower pressure, halts further increases of the high pressure and prevent transmission to the silicium wafer sensor. The differential pressure is thereby limited to the calibration value of the pre-charge of the said polarization spring.

Another distinctive feature of the present invention is that on polarization spring is precharged to a value to subject the silicium wafer to a differential pressure which is lower than its safety limit.

According to another distinctive feature of the invention said single spring polarizing the expansion bellows is mounted pre-charged to a prefixed value between double supports of the bellows and in the body of the transmitter respectively so that the shifting of the bellows in one direction or in the other and opposite direction always, causes compression of said spring.

In addition to allowing the expansion bellows to intervene in two directions for excessive pressure, the spring insures a perfect return to the rest and central position of said bellows when excessive pressure ceases.

Also, the use of a single polarization spring mounted as above insures that the calibration of the excessive pressure is the same in both directions, allowing the minimization of engaged and therefore the total height of the transmitter and consequently the volume of inert liquid necessary to fill it.

Now, by taking into account that the movable expansion bellows, must never rest on the low pressure side of the transmitter body, it is to be noted that in a such protection system, the separation membranes can undergo permanent deformations when they strike the seats of the transmitter body because of excessive pressure. This causes undesirable variations of the calibration values (zero drift), not present in good and precise working membranes and seats.

Another embodiment of the invention obviates the total support of the separation membranes, on their seats on the high pressure side, by avoiding any deformation of said membranes and in this way obtaining a better holding of the zero value at excessive pressure.

According to said embodiment of the invention, the expansion bellows is provided with two seal elements disposed in such a way to close an inlet duct to inert liquid and prevent the flow thereof to the separation membrane on the low pressure side. These elements are elastically and slidably mounted along the axis of the bellows which can continue to move while pressures changes.

In this way, the value of the high pressure is no longer blocked, and may continue to increase, but the low pressure acting on silicium wafer sensor is compelled to follow the trend of the high pressure so that the differential pressure astride silicium wafer sensor remains limited to the calibration value of said spring no matter what the excessive pressure may be.

In this embodiment the static pressure of the separation liquid around the sensor corresponds to the high pressure value which can continue to increase. This results in the evident necessity of present seating because a minimum leak causes the immediate breaking of the silicium wafer sensor.

The invention is now described in detail with reference to the annexed drawings which illustrate a preferred practical embodiment of the invention given only as an example thereof since technical and constructive variations can be made without departing from the scope of the present invention. In said drawings.

Figure 1:
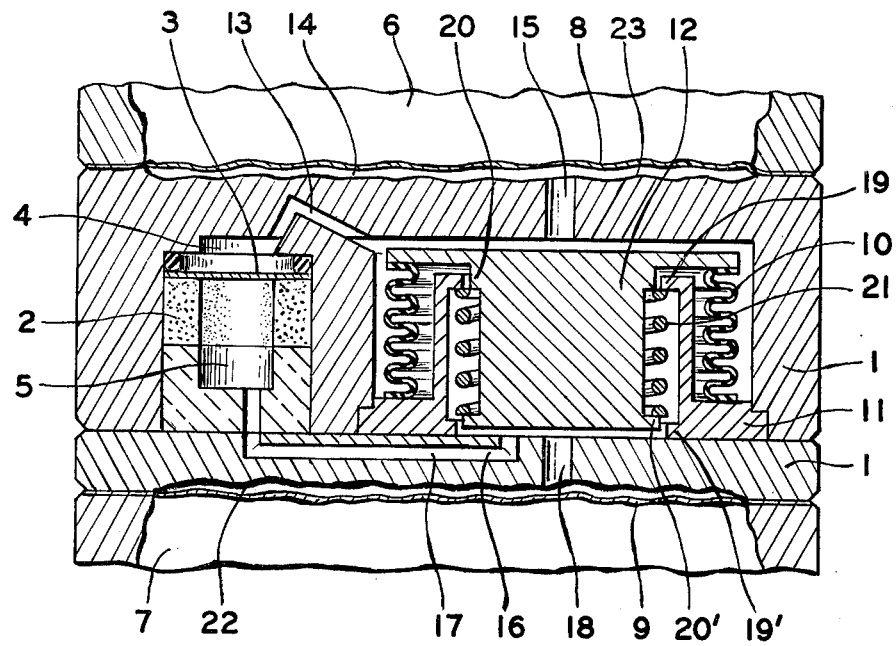
FIG. 1 is a front view in section of a differential pressure transmitter having a silicium wafer and a protection system in accordance with the invention.

By making reference to the figures, 1 is the body of the differential pressure transmitter inside of which is rigidly lodged a silicium wafer sensor element having a hollow cylinder 2 and a disc 3, which is sensitive to the pressure difference existing between chambers 4 and 5 astride the disc 3 of said sensor.

Since the process fluids, on which the measurement is made, can be chemically active, said silicium wafer sensor is protected from contact with said fluids which act respectively on the chambers 6 and 7, by two waves metallic separation membrane 8 and 9 by an inert filling liquid which transmits and the pressure difference between said fluids in an unalterated manner.

In order to prevent that the pressure difference existing between the chambers 4 and 5, which can assume considerable values and damage the silicium wafer sensor, interposed between said chambers is an expansion bellows 10.

An extremity of the bellows is hermetically fixed on a circular support 11 having a transversal section L, which at its turn is hermetically blocked in a cavity of the body 1. The other extremity of the bellows is hermetically fixed to the extremity of a movable body 12 which is slidable within said support 11.

The external part of the bellows communicates with the chamber 4 by means of duct 13 and with the zone 14 adjacent to the waves separation membrane 8 by means of the inlet channel 15.

The internal part of the bellows communicates with the chamber 5 by means of a duct 16 and with the zone 17 adjacent the wave separation membrane 9 by means the admission channel 18.

Both the support 11 and the body 12 present corresponding projections, 19, 20, and 19', 20', which constitute the double supports for a spring 21 mounted pre-charged to a value corresponding to the maximum differential pressure tolerable without damage to the silicium wafer sensor.

The way of operating of the protection system of the present invention it is evident.

Figure 2:
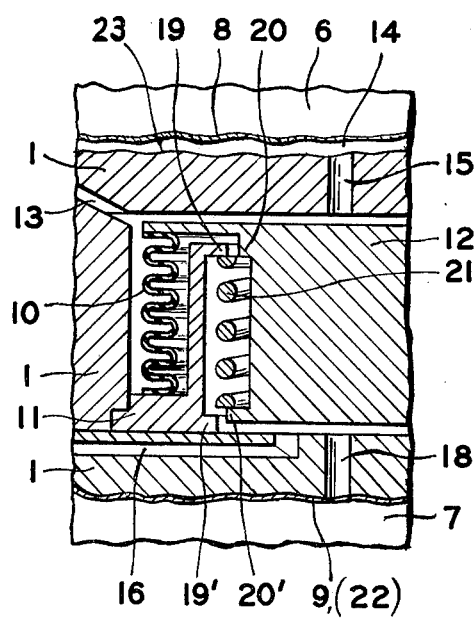
FIG. 2 is an enlarged partial view, of the protection system of FIG. 1, wherein the bellows have been moved by a overpressure acting on lower part.

When the high pressure, acting for example in chamber 7 from the bottom against the wave metallic membrane 9 (see specifically the FIGS. 1 and 2) increases in such a way that the differential pressure existing between the chamber 7 and 6 and therefore between the chamber 5 and 4 astride the silicium wafer sensor tends to exceed the precharge value of the spring 21, the body 12 and consequently the bellows 10 is displaced upward and the said spring is compressed between the projections 19 and 20'.

This displacement upward of the bellows 10 intakes from the other part the inert filling liquid contained in the zone 17 and allows the wave separation membrane 9 to be seated on its equally waved seat 22 of the body 1 of the transmitter.

By means of said seating of the membrane, a further increase in the high pressure cannot be transmitted to filling liquid and the differential pressure astride the silicium wafer sensor rests at the pre-charge value of the spring 21.

Figure 3:
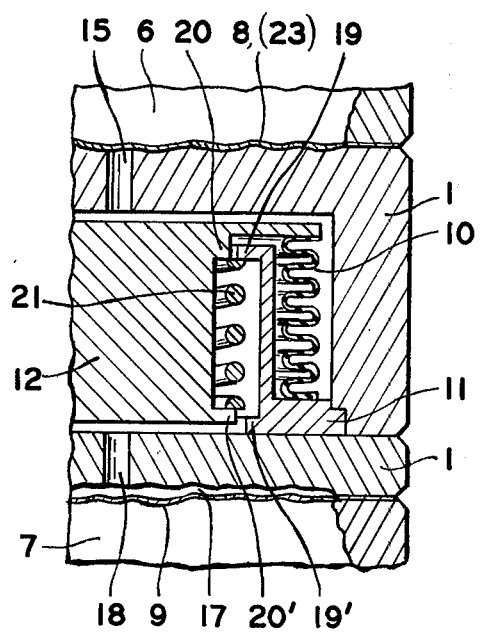
FIG. 3 is a view analogous to that of FIG. 2, in which the bellows are moved by an overpressure acting on the upper part.

FIG. 3 shows the running of the protection system of the invention, when the high pressure acts in the upper chamber 6 against the wave metallic separation membrane 8.

In this case the membrane 8 is placed on its seat 23 and the movable body 12 is moved downwardly the compression of the spring, 21 between projections 20 and 19'.

According to this embodiment, the movable body 12 is dimensioned in such a way never to rest, during its shifting, against the inside walls of the hollow of the body 1 of the transmitter, and never to close the induction channels (15 and 18).

Figure 4:
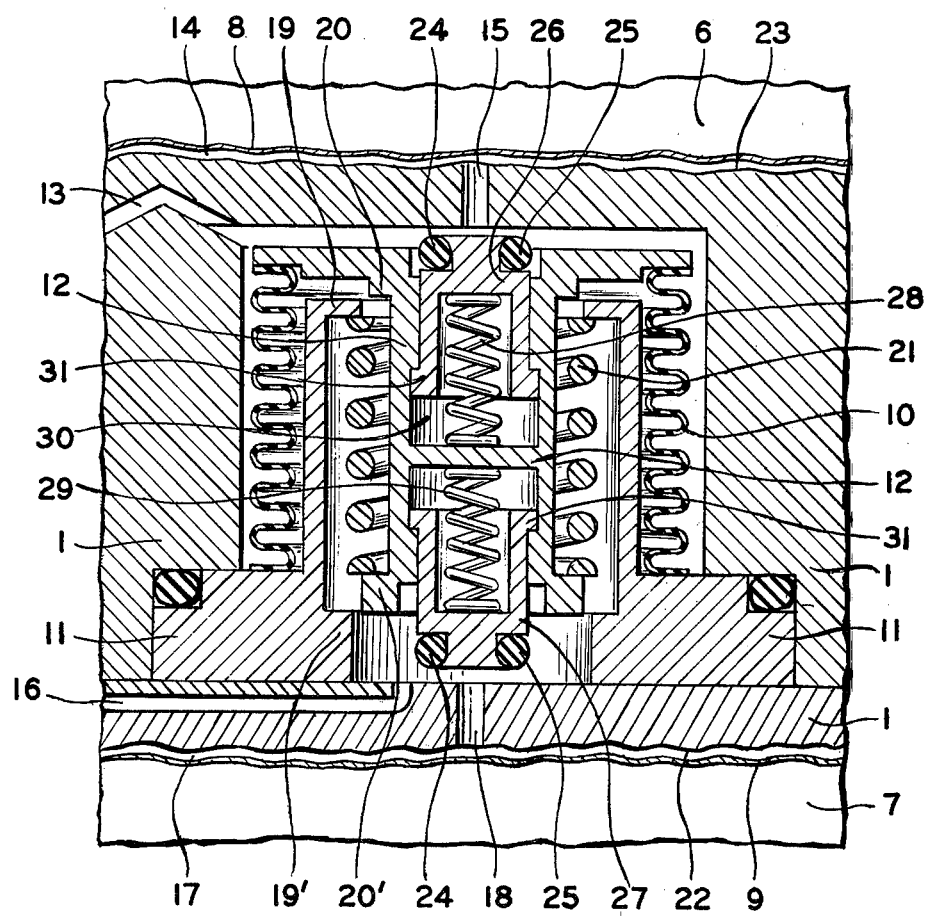
FIG. 4 is a partial front view in section of another embodiment of the invention illustrations the protection system when subjected to an overpressure acting on the lower part.

Finally FIG. 4 shows another embodiment of the invention which avoids the complete support of the wave separation membrane 8 or 9 on the respective seat 22 and 23 on high pressure side and therefore prevents permanent deformation of said membrane caused by an imperfect coincidence between its weaves and those of its seat 22 or 23.

According to this embodiment said movable body 12 is provided with two seal elements, like two O-rings 24 and 25, which close the induction channel 15 or 18 situated on the low pressure side when said movable body 12 is moved by the overpressure.

More precisely, when excessive or overpressure acts from the bottom against the membrane 9 like in FIG. 4, the upward shifting of the movable body 12 brings the seal elements 24 and 25 to interrupt the channel 15, whereas the downward shifting of the movable body 12 caused by excessive or overpressure acting from the upper part on the membrane 8 interrupts the channel 18.

In both cases the interruption of the induction channel, situated on low pressure side, constrains the low pressure which is blocked in one of the chambers astride the silicium wafer sensor, to vary in correspondence with high pressure which can continue to increase. In this way their difference, that is the differential pressure, remains constantly equal to the pre-charge value of the spring 21.

On the other hand, since the system bellows-spring continues to act as a limiter of the differential pressure only till said system can move for keeping the equilibrium between pressures in question and the elastic reaction, of the spring, i.e., till the movable body 12 goes to rest on body 1 of the transmitter, said seal elements 24 and 25 are not integral with the movable body 12 of the bellows but are supported by two opposed sliders 26 and 27 which can slide along the axis of said movable body 12 driven in the hollow of body 1 and put in action in opposite directions by springs 28 and 29.

In this way, when the seal elements 24 and 25 goes to rest by interrupting either the channel 15 or the channel 18, the system bellows-spring can still move by compressing the spring 28 or 29 of said sliders. The possible stroke of the movable body 12, and, therefore, of the bellows, being limited by the length of the drive 30 within which acts the projections 31 of said sliders 26 and 27 and being such that contact between movable body 12 and body 1 of the transmitter is avoided.

I claim:

1. A protection system for a silicium wafer sensor used in a differential pressure transmitter which prevents the pressure difference from reaching values which can damage the sensor, comprising:
   a transmitter having a body with two opposed, spaced seats,
   two wave protection membranes connected to said body and normally spaced from said seats for protecting the sensor from the fluids to be measured and for transmitting the pressure of the fluids in contact with said membranes to the sensor,
   two spaced zones within said body between said seats and between which the sensor is mounted for measuring the pressure differential of the fluids,
   a cavity in said body spaced from said zones and between said seats having housed therein expansion bellows polarized by a single spring within said bellows which is pre-charged to a prefixed value and which is always in compression when said bellows are moved in either direction, said cavity being in communication with said spaces between said membranes and said seats and with said zones, and
   an inert liquid in said zones and cavity which transmits the fluid pressure on said membranes to said sensor and which causes said bellows always to move toward the low pressure side of the system to allow said wave separation membrane on the high pressure side of the system to move to its seat when the pressure differential exceeds the value of the pre-charge of said spring under compression, to thereby prevent the pressure differential in said zones from reaching values which can damage the sensor.

2. The system according to claim 1, wherein said silicium wafer sensor is mounted rigidly within said body of the transmitter.

3. The system according to claim 2, wherein said polarizing spring of the expansion bellows of the protection system is mounted precharged to a pre-fixed value between supports on said bellows and on said body of the transmitter so that movement of the bellows in either direction results always in compression of said spring.

4. The system according to claim 3, wherein said polarizing spring of the expansion bellows is pre-charged to a value such that the stress on the silicium wafer sensor by means of differential pressure is always lower than said prefixed value.

5. The system according to claim 1, wherein said expansion bellows never contacts the low pressure side of the body of the transmitter during movement of said bellows.

6. A protection system for a silicium wafer sensor used in a differential pressure transmitter which prevents the pressure difference from reaching values which can damage the sensor, comprising:
   a transmitter having a body with two opposed, spaced seats,
   two wave protection membranes connected to said body and normally spaced from said seats for protecting the sensor from the fluids to be measured and for transmitting the pressure of the fluids in contact with said membranes to the sensor.
   two spaced zones within said body between said seats and between which the sensor is mounted for measuring the pressure differential of the fluids,
   a cavity in said body spaced from said zones and between said seats having housed therein expansion bellows polarized by a single spring within said bellows which is pre-charged to a prefixed value and which is always in compression when said bellows are moved in either direction, said cavity being in communication with said spaces between said membranes and said seats with said zones,
   two sealing elements extending from opposite ends of said bellows which cut off communication between said cavity and space between said membranes and its seat when said bellows moves toward the low pressure side of the system to halt the flow of liquid into the space between said seat and membrane on the low pressure side and to maintain liquid in the space between said seat and membrane on the high pressure side of the system, to thereby prevent damage to said high pressure membrane which can be caused by contact with its seat, said elements being slidably mounted within said bellows along the axis thereof, and
   an inert liquid in said zones and cavity which transmits said fluid pressure on said membranes to said sensor and which causes said bellows and sealing elements to move toward the low pressure side of the system where said sealing element cuts off the described communication when the pressure differential exceeds a prefixed value.

7. The system according to claim 6, wherein said seal elements are slidably mounted along the axis of said bellows by means of two opposed sliders which slide in axial hollows in said bellows and are polarized in opposite outwardly directions by spring means, the sliding stroke of said sliders being limited by projections thereon which cooperate with shoulders on said bellows in said axial bellow.

8. The system according to claim 7, wherein said seal elements are o-rings.

* * * * *

UNITED STATES PATENT AND TRADEMARK OFFICE
CERTIFICATE OF CORRECTION

PATENT NO. : 4,028,945

DATED : June 14, 1977

INVENTOR(S) : Giorgio Bergamini

It is certified that error appears in the above-identified patent and that said Letters Patent are hereby corrected as shown below:

In the Title, Delete "THE OVERPRESSURES OF".

Column 1, In the Title, Delete "THE OVERPRESSURES OF".

line 15, After "varies" insert a period --.--.

line 16, Correct "they" to read --They--.

line 48, Delete "to"(second occurence).

line 54, Change "the"(first occurence) to --. The--.

Column 2, line 3, Correct "prevent" to read --prevents--.

line 8, After "that" change "on" to --the--.

line 26, After "engaged" insert --space--.

line 45, Before "inert" insert --the--.

line 61, Correct "present" to read --proper--.

UNITED STATES PATENT AND TRADEMARK OFFICE
CERTIFICATE OF CORRECTION

PATENT NO. : 4,028,945
DATED : June 14, 1977
INVENTOR(S) : Giorgio Bergamini

It is certified that error appears in the above-identified patent and that said Letters Patent are hereby corrected as shown below:

Column 3, line 26, After "9" insert --and--.

line 27, After "transmits" delete "and".

line 35, After "L" insert --shaped--.

line 49, After "20'" insert --respectively--.

Column 4, line 13, After "downwardly" insert --by--.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*